United States Patent
Mizoi

(10) Patent No.: US 7,464,866 B2
(45) Date of Patent: Dec. 16, 2008

(54) PRINT PROCESSING APPARATUS AND METHOD

(75) Inventor: Tsuyoshi Mizoi, Saitama (JP)

(73) Assignee: Fuji Xerox Co., Ltd, Tokyo (JP)

( * ) Notice: Subject to any disclaimer, the term of this patent is extended or adjusted under 35 U.S.C. 154(b) by 231 days.

(21) Appl. No.: 11/212,884

(22) Filed: Aug. 29, 2005

(65) Prior Publication Data

US 2006/0177255 A1   Aug. 10, 2006

(30) Foreign Application Priority Data

Feb. 10, 2005   (JP)   ............................... 2005-034497

(51) Int. Cl.
G06F 7/08   (2006.01)
(52) U.S. Cl. ...................................... 235/381; 235/380
(58) Field of Classification Search ................. 235/380, 235/381; 705/51, 52; 358/1.1, 1.15
See application file for complete search history.

(56) References Cited

U.S. PATENT DOCUMENTS 7,124,094 B1 * 10/2006 Kobayashi et al. ............ 705/26
7,127,433 B2 * 10/2006 Baker .......................... 705/400
7,190,467 B2 * 3/2007 Simpson et al. .............. 358/1.1
2002/0046129 A1 * 4/2002 Nakagawa .................... 705/26
2003/0191718 A1 * 10/2003 Blair ............................ 705/51
2005/0122540 A1 * 6/2005 Kadowaki ................... 358/1.15
2005/0203805 A1 * 9/2005 Clough et al. ................. 705/26

FOREIGN PATENT DOCUMENTS

JP   A 2002-149516   5/2002
JP   A 2004-112115   4/2004

* cited by examiner

Primary Examiner—Ahshik Kim
(74) Attorney, Agent, or Firm—Oliff & Berridge PLC

(57) ABSTRACT

A print processing apparatus that reads and processes data to be printed in response to a print instruction for previously stored data, and prints out the data thus processed by means of an image forming unit after completing settlement processing of a print service fee charged for the printing, comprises a setting unit that sets restriction items relating to the printing of the data to be printed; an image processing unit that processes the data to be printed into restricted print data conforming to a print-out form that satisfies the restriction items set by the setting unit; and a data transmitting unit that transmits the restricted print data processed by the image processing unit to the image forming unit.

18 Claims, 13 Drawing Sheets

AMOUNT LIMIT SETTING

PLEASE ENTER AMOUNT LIMIT

AMOUNT LIMIT: 200 YEN

ENTER

TIME LIMIT SETTING

PLEASE ENTER TIME LIMIT

TIME LIMIT: 3 MINUTES

ENTER

NUMBER-OF-SHEETS LIMIT SETTING

PLEASE ENTER LIMIT FOR NUMBER OF SHEETS

LIMIT FOR NUMBER OF SHEETS: 2 SHEETS

ENTER

OUTPUT SAMPLE DISPLAY:

PRINT PROCESSING APPARATUS AND METHOD

BACKGROUND OF THE INVENTION

1. Background of the Invention

The present invention relates to print processing apparatus and method for providing a pay print service to print previously stored data. More particularly, the present invention relates to print processing apparatus and method which enables a print service user, although the user has restrictions to the use of the service, such as a restriction due to having only a small amount cash money in hand, to obtain a print out in a form satisfying the restriction.

2. Description of the Related Art

Among a variety of print services available today, there is a print service system in which a user sends data from his/her personal computer (PC) to a print service terminal installed in a print service center in a downtown area via a network, and afterwards the user visits the print service center to obtain a print-out of his/her data by paying a fee.

In such a print service system which provides a pay print service for a user being in a visiting place with the use of a remote environment as described above, the recently developed information technology (IT) provides an environment which enables users to use credit cards and electronic money as well as ordinary money for settling the print service fee.

However, since different print service centers may employ different settlement media, a user cannot always use a certain settlement medium at any place. Therefore, even though a user has sufficient electronic money, the user may not be able to obtain a pay print service without cash money (especially coins).

For example, a print service center may provide a print service charging 100 yen per A4 sheet for printing, while employing a single settlement method of accepting cash payment only. In such a print service center, a situation may be supposed in which a user has only 200 yen in hand and wants to obtain a print out of 20 sheets of data. In such a situation, even if the user has electronic money or credit cards, there is no device installed to accept them in the print service center, and the user is able to print out only two sheets by paying the 200 yen in hand.

Japanese Patent Application Publication No. 2002-149516 describes a technique that provides a print service using a network environment. According to this technique, a server previously collects, from service providing equipment, service information that is available from the equipment. In response to a request from a client, the server provides the client with service information available from the service providing equipment connected to the server.

Also, Japanese Patent Application Publication No. 2004-112115 describes a technique that improves convenience of use by dividing an enormous service menu into a basic service menu and a more detailed service menu based on information received from clients.

As described above, no standardized settlement processing method is adopted among service centers in the conventional print service system that provides a user being in a visiting place with a pay print service in a remote environment. Therefore, if the user has a sufficient electronic money but no cash money as a settlement medium, he/she is not able to print data if the service center accepts cash payment only.

In this connection, neither Japanese Patent Application Publication No. 2002-149516 nor Japanese Patent Application Publication No. 2004-112115 describes or suggests a technique to enable a user to obtain a pay print service even if he/she does not have enough cash money in hand to settle the printing fee to be charged to print out the desired data.

Additionally, when a user being in a visiting place uses a pay print service at a service center employing this type of print service system, it happens rather often that the user has only a short time available such as short waiting time for transportation, or the user is carrying a heavy object and does not want to carry any more heavy or bulky objects (many sheets of paper).

Neither JP 2002-149516 nor JP 2004-112115 above suggests any technique to enable the user who has such a restriction as described above to obtain a print service within the range of the restriction.

Accordingly, the conventional system that provides a user being in a visiting place with a pay print service in a remote environment cannot provides a user who has restrictions to the use of the service, such as a restriction due to having only a small amount of cash, a restriction due to having only short time available, or a restriction of being unable to increase the volume or weight of his/her carrying objects, with a print service within the range of the restrictions and in an output form the user desires.

SUMMARY OF THE INVENTION

The present invention has been made in view of the above circumstances and provides print processing apparatus and method that are capable of providing a user, who has a restriction to the use of the service due to, for example, having only a small amount of cash, with a pay print service within the range of the restriction and yet in a desirable output form.

According to an aspect of the present invention, a print processing apparatus that reads and processes data to be printed in response to a print instruction for previously stored data, and prints out the data thus processed by means of an image forming unit after completing settlement processing of a print service fee charged for the printing, comprises a setting unit that sets restriction items relating to the printing of the data to be printed; an image processing unit that processes the data to be printed into restricted print data conforming to a print-out form that satisfies the restriction items set by the setting unit; and a data transmitting unit that transmits the restricted print data processed by the image processing unit to the image forming unit.

With the above configuration, even if the user has a restriction to the use of the print service due to, for example, having only a small amount of money in hand, having only a short time available such as a short waiting time for transportation, or being unable to carry a heavy or bulky load, the user is allowed to set, as the restriction items, limits for the settlement amount (print service fee), the printing time and the number of printing sheets of paper based on the amount of money in hand, or the allowable waiting time or number of sheets of paper. Thus, the user is able to obtain print-out of the data he/she wants to print, within a limit of the amount of money in hand, the allowable waiting time, or the printable number of sheets of paper and yet in a desirable form. As a result, the convenience of the pay print service can be improved.

Further, an output sample composed of sample images of the respective pages of restricted print data that is generated reflecting restriction items is displayed, an instruction to change a print control parameter for the restricted print data corresponding to the output sample is accepted to reprocess the restricted print data, and a reprocessed output sample corresponding to the reprocessed data is displayed. These steps of processing are repeated until the user is satisfied with the output sample or the reprocessed output sample. Upon being satisfied, the user performs a print start operation to start printing the restricted print data or the reprocessed data corresponding to the output sample or the reprocessed output sample. The user manually instructs a change of the print control parameter based on the output form of the restricted print data automatically generated according to the restriction items. Therefore, the present invention is capable of addressing the user's detailed demands in reediting the final output form, and is capable of easily providing the user with an output result satisfying the restriction items and yet in a most desirable form.

BRIEF DESCRIPTION OF THE DRAWINGS

Embodiment of the present invention will be described in detail based on the following figures, wherein:

FIG. 5A shows an example of a screen display to set an amount limit;

FIG. 5B shows an example of a screen display to set a time limit;

FIG. 5C shows an example of a screen display to set a limit for a number of sheets of paper;

DESCRIPTION OF THE PREFERRED EMBODIMENTS

Embodiment of the present invention will now be described in detail with reference to the accompanying drawings.

Figure 1:
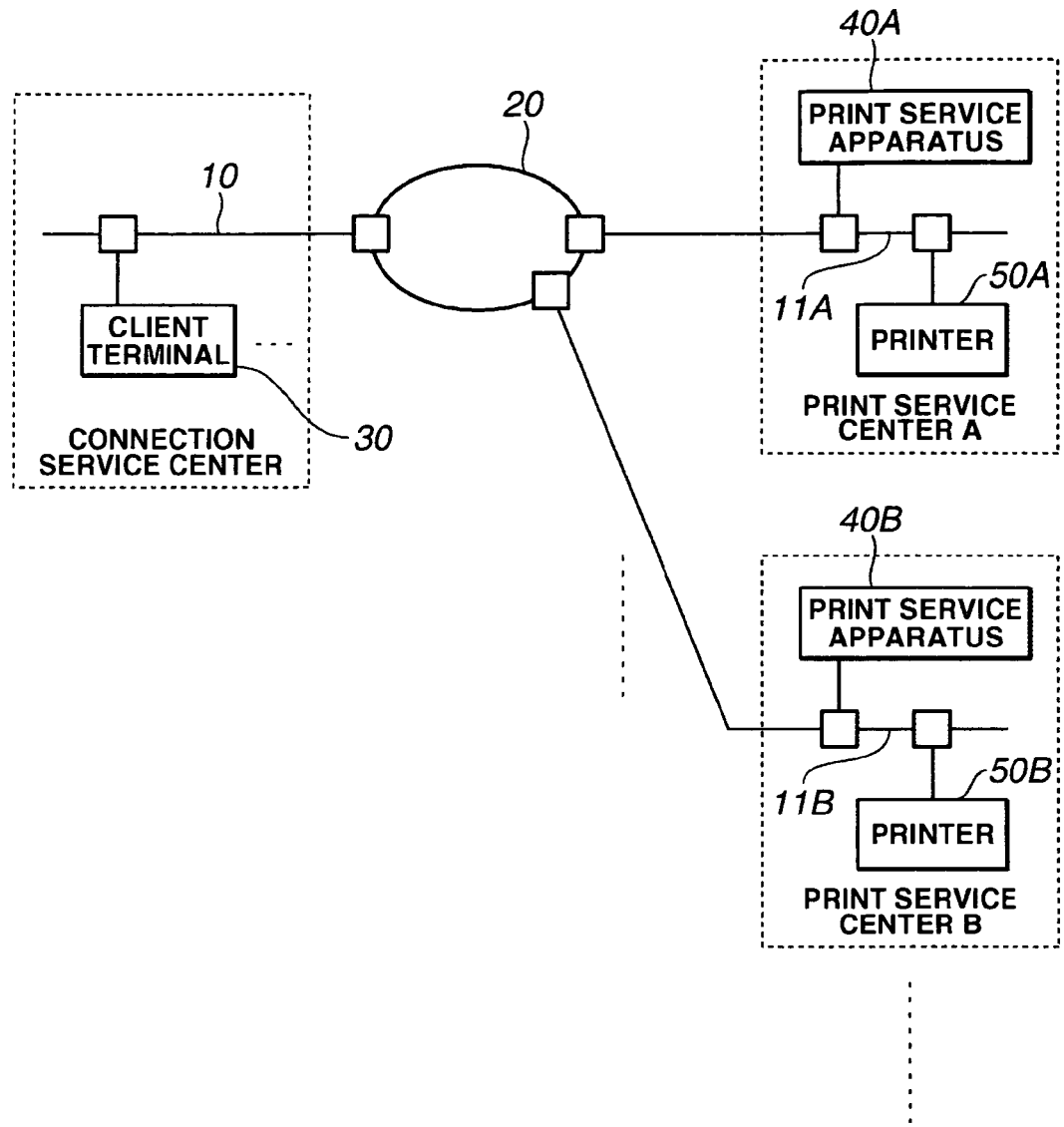
FIG. 1 is a schematic diagram illustrating an overall configuration of a print processing system according to an embodiment of the present invention.

FIG. 1 is a schematic diagram illustrating an overall configuration of a print processing system according to the present invention.

This print processing system connects, by means of a network 20, an intranet 10 that is provided in a connection service center established for example at a location (e.g., in a building) in an urban area, to each of intranets 11 (11A, 11B, . . . ) which are respectively provided in plural print service centers (A, B, . . . ) established at locations remote from the urban connection service center. The system also connects, in each of the print service centers, the intranet 11 to a print service apparatus 40 (40A, 40B, . . . ) and a printer 50 (50A, 50B, . . . )

The system according to the present invention is designed to provide a remote print service in which, for example, data is transmitted from a client terminal or personal computer (PC) 30 connected to the intranet 10 in the connection service center to a print service apparatus 40 in one of the print service centers (A, B, . . . ), and the data is printed out by the printer 50 associated with the print service apparatus 40 receiving the data.

When using this remote print service, the user connects his/her PC 30 to the intranet 10 in the connection service center, selects a desired print service center, and transmit data to the print service apparatus 40 (corresponding to the print processing apparatus) in the selected print service center. The print service apparatus 40 in the selected print service center stores the data transmitted from the user's PC 30 in a storage.

After that, the user goes to the selected print service center to instruct the print service apparatus 40 to give a print instruction operation to print out the previously stored data (the data the user has transmitted). In response to the print instruction operation, the print service apparatus 40 reads out the data printing of which is instructed (data to be printed) from the storage and processes the data to be printed. The processed data is printed out by the printer 50 after completing the settlement processing of a print service fee.

In the usage of the pay print service, the print service apparatus 40 allows the user to set, in the course of giving the print instruction, various restriction items such as a settlement amount limit, printing time limit, and a limit for the number of sheets of paper. The print service apparatus 40 processes the data to be printed into print data conforming to a print-out form satisfying the restriction items set by the user, and prints out the processed data in response to a predetermined print start operation. This is the restricted print control function that the print service apparatus 40 has.

A detailed description will now be made of a configuration and restricted print control operation of the print service apparatus 40 according to the present invention.

Figure 2:
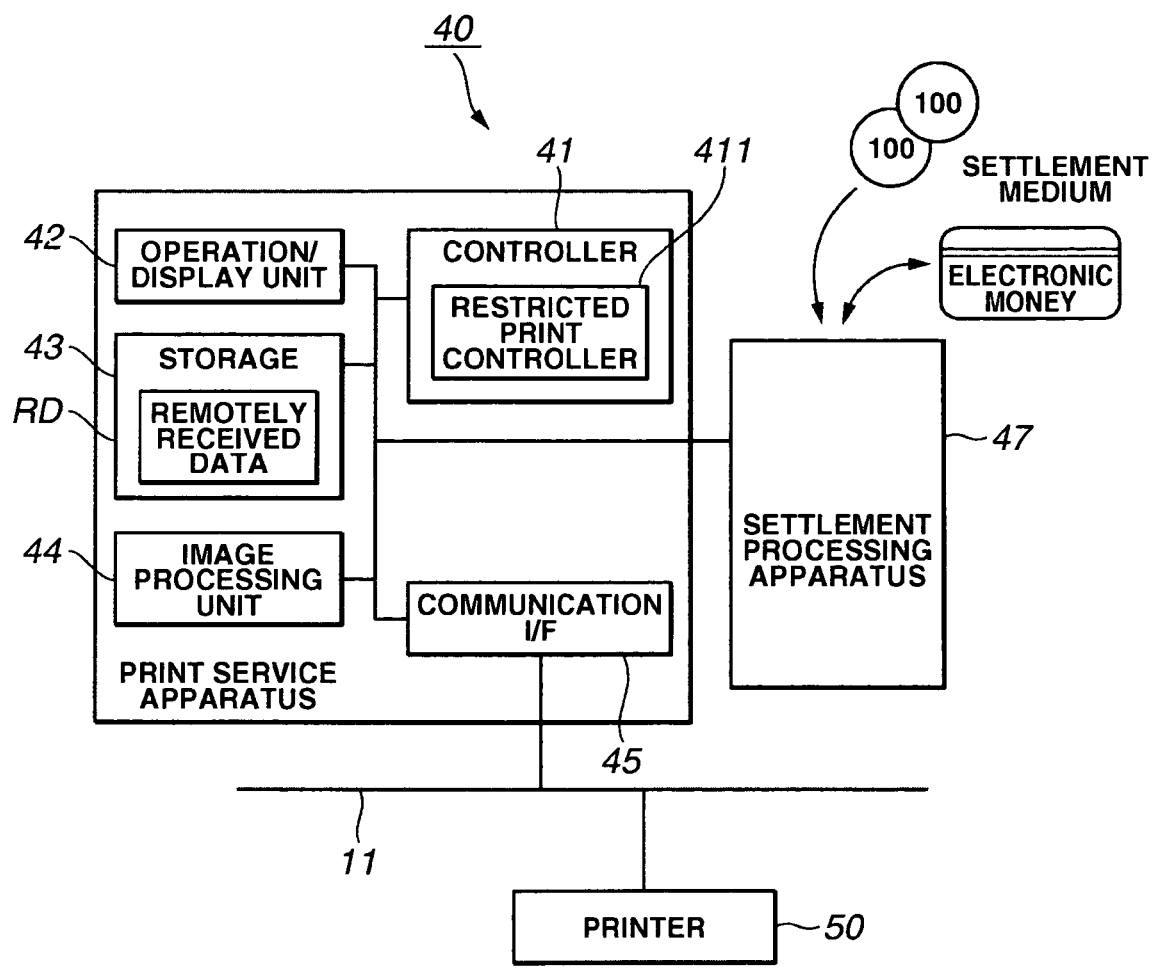
FIG. 2 is a block diagram illustrating a functional configuration of the print service apparatus.

FIG. 2 is a block diagram illustrating a functional configuration of the print service apparatus 40 according to the present invention.

As shown in FIG. 2, the print service apparatus 40 includes a controller 41 for controlling the print service apparatus 40 as a whole, and an operation/display unit 42 having a touch panel and various operation keys. The operation/display unit 42 has an operation function of giving various instructions including a print instruction and entering various information by touching the panel or operating the operation keys, and a display function of displaying on the panel various information and various user interface (UI) screens used for conducting print operations. The print service apparatus 40 further includes a storage 43 for storing an operation program and various information including data received from each user's PC 30 via the network 20 (in FIG. 2, indicted as remotely received data RD), an image processing unit 44 for processing image data printing of which is instructed, a communication interface unit 45 serving as a communication interface (I/F) for receiving data from the PC 30 and transmitting data to the printer 50, and a settlement processing apparatus 47 for performing settlement processing of a print service fee by means of a settlement medium such as cash money, a credit card or electronic money.

The controller 41 is provided with a restricted print controller 411 for performing restricted print control on a series of processing steps: a processing step to accept an instruction to print previously stored data according to a user's predetermined operation on the operation/display unit 42; a processing step to accept selection of a restricted print mode for the data printing of which is instructed (data to be printed); a processing step to accept the user's setting of restriction items in the restricted print mode; a data processing step performed by the image processing unit 44 to process the data to be printed into data (restricted print data) corresponding to the print-out form satisfying the restriction items set by the user; an output sample display processing step to generate a sample image (thumbnail image) corresponding to each page of the processed restricted print data, and to display on the operation/display unit 42 a list of output samples of the restricted print data with the use of the generated thumbnail images of the respective pages; a processing step to accept an instruction to change any print control parameter of the restricted print data according to a user's predetermined operation on the operation/display unit 42 during the display of the output sample; a reprocessing processing step to reprocess the restricted print data according to the accepted change instruction, and to cause the image processing unit 44 to generate reprocessed data; a processing step to display on the operation/display unit 42 reprocessed output samples consisting of thumbnail images of the respective pages of the reprocessed data; a processing step to transmit to the printer 50 corresponding data (restricted print data or reprocessed data) and to cause the printer 50 to print out the data in response to a predetermined print start operation on the operation/display unit 42 during the display of the output sample corresponding to the restricted print data or of the reprocessed output sample corresponding to the reprocessed data; and a service charge settlement processing step performed by the settlement processing apparatus 47 to settle a print service fee charged to print the data prior to the print-out of the data by the printer 50.

A description will now be made of a print processing operation of the print service apparatus 40.

As described above, prior to the use of the print service, the user transmits data which he/she wants to print to the print service apparatus 40 from the user's PC 30 connected to the intranet 10 in the connection service center. The print service apparatus 40 receives this data transmitted by the user's PC 30 via the network 20 by means of the communication interface 45, and stores and manages the data in the storage 43.

The user later visits the print service center, and uses a user interface screen displayed on the operation/display unit 42 to retrieve the stored data which the user has previously transmitted, and to perform a print instruction operation to print the retrieved data. Thereupon, the print service apparatus 40 implements the processing to read out the data to be printed from the storage 43 and to cause the printer 50 to print out the data.

Figure 3:
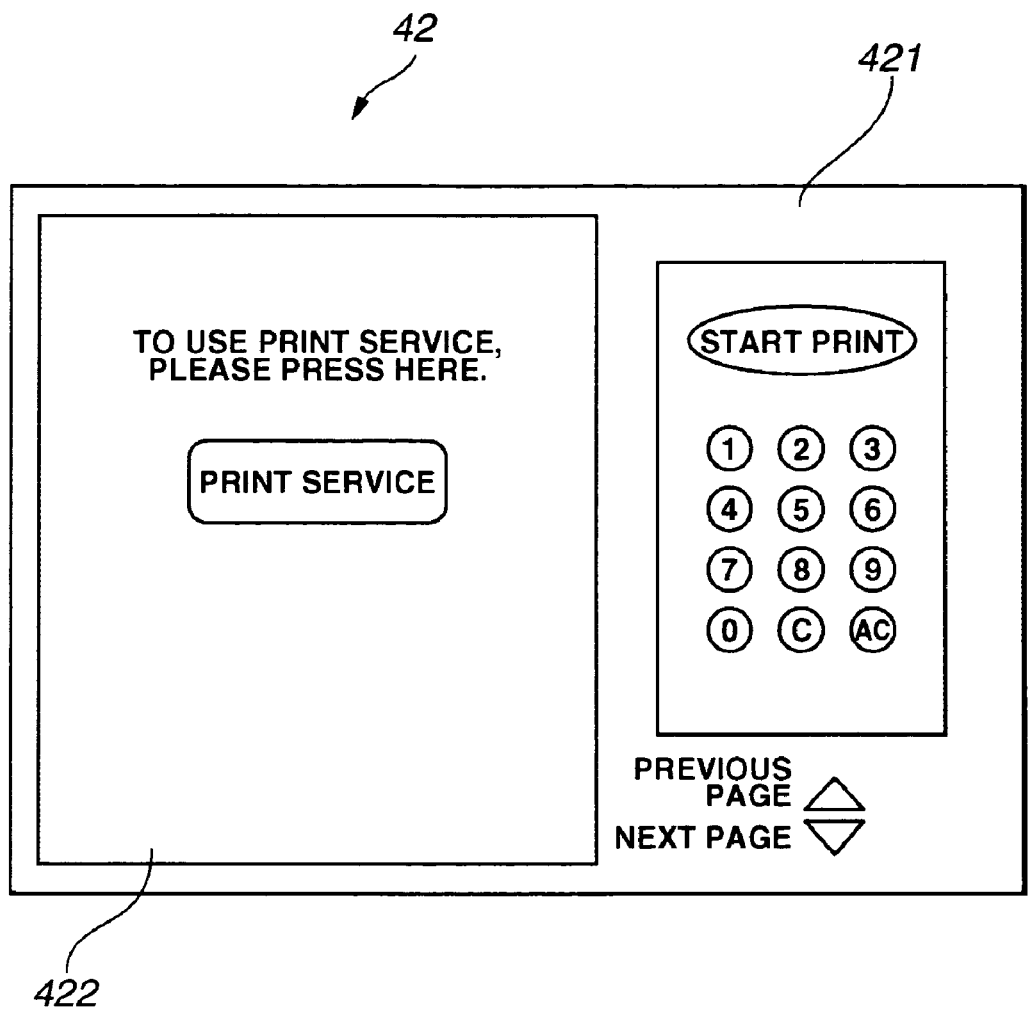
FIG. 3 is a schematic diagram illustrating a configuration of the operation/display unit of the print service apparatus.

FIG. 3 schematically shows a configuration of the operation/display unit 42 of the print service apparatus 40.

As shown in FIG. 3, the operation/display unit 42 includes a key operation unit 421 having a print start button, numeric keys and a page scroll button, and a touch panel 422 having a function to display various user interface screens and a function to receive various instructions entered by the user touching information displayed on the screen.

During a print instruction waiting state (stand-by state) after storing the data transmitted from the user's PC 30 in the storage 43, an initial screen as shown in FIG. 3 is displayed on the touch panel 422 of the print service apparatus 40.

When the user selects (touches) a "print service" button on the initial screen, the touch panel 422 displays a print instruction guidance message saying, for example, "Please select data and execute a print instruction", together with operation buttons (not shown) required to retrieve data and to give a print instruction.

The user is thus allowed to retrieve the data (the remotely received data RD in FIG. 2) which has been stored after the user's remote transmission, and to enter an instruction to print the data, by operating the operation buttons on the touch panel 422 as necessary.

Figure 4:
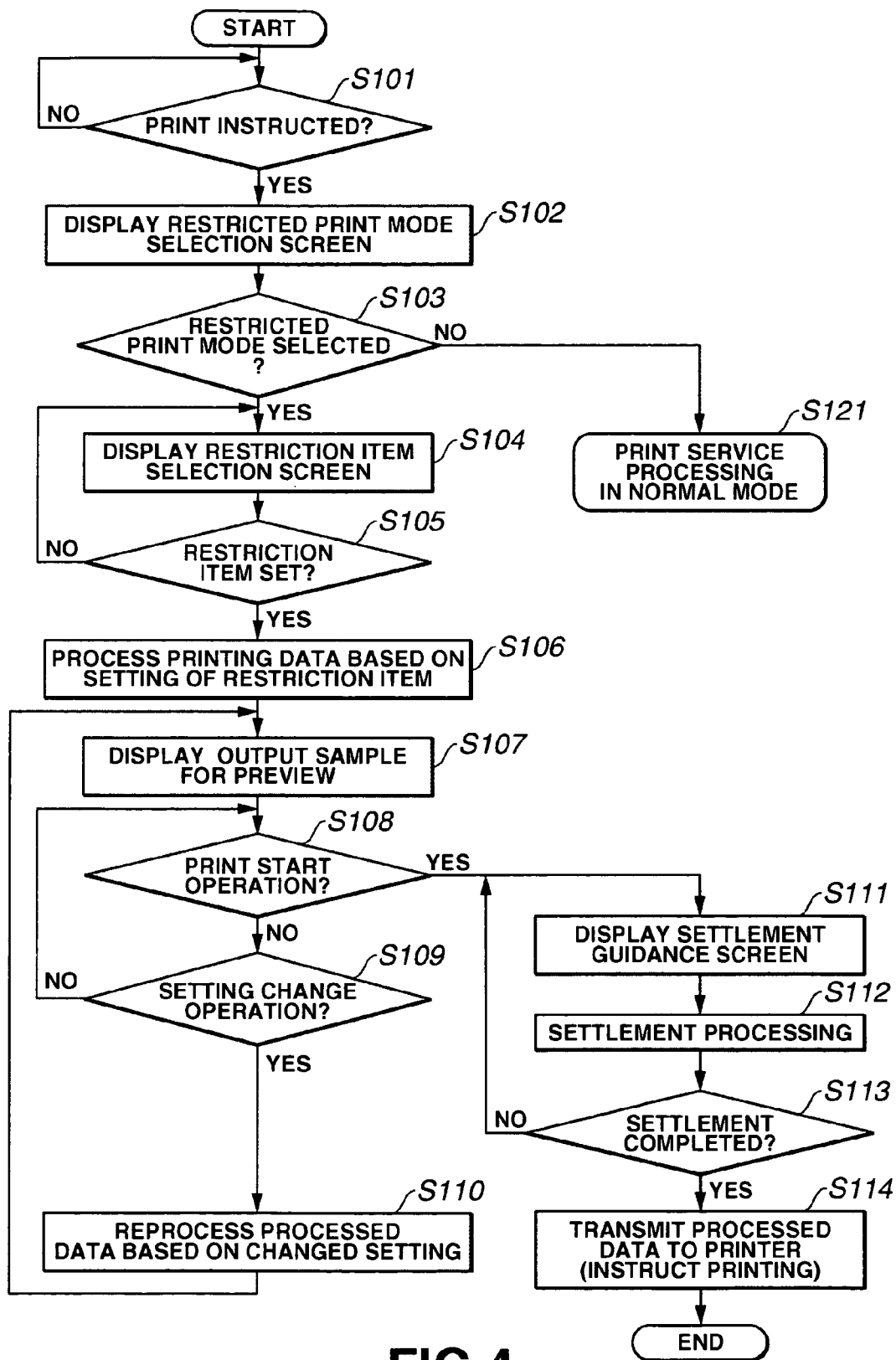
FIG. 4 is a flowchart illustrating a print processing operation by the print service apparatus.

FIG. 4 is a flowchart illustrating the print processing operation which is performed by the print service apparatus 40 in response to the print instruction.

After the "print service" button is pressed on the initial screen, the print service apparatus 40 monitors whether or not the print instruction operation is performed by the user with the use of the touch panel 422 (step S101). If the print instruction operation is performed (YES in step S101), the restricted print controller 411 displays on the touch panel 422 a selection screen for selecting the restricted print mode (not shown) (step S102), and determines whether or not the restricted print mode is selected on the screen (step S103).

When the restricted print mode is not selected by the user (NO in step S103), the controller 41 displays a print operation screen for the normal print mode on the touch panel 422, and proceeds to print service processing in the normal print mode according to the user's operation on the print operation screen (step S121).

In contrast, when the restricted print mode is selected by the user (YES in step S103), the restricted print controller 411 displays a restriction item setting screen on the touch panel 422 (step S104) to perform the processing to accept the user's restriction item setting operation.

For a specific example, in step S103 described above, a restriction item selecting screen (not shown) including selection buttons of "amount restriction", "time restriction", and "number-of-sheets restriction", for example. When one of these buttons is pressed (YES in step S103), a restriction item setting screen for the item corresponding to the pressed button is displayed in step S104.

FIGS. 5A to 5C show examples of restriction item setting screens for setting the restriction items of "amount limit", "time limit" and "number-of-sheets limit" which can be selected by pressing the "amount restriction" button, "time restriction" button, and "number-of-sheets restriction" button on the restriction item selecting screen. Specifically, FIG. 5A shows a display example of amount limit setting screen 422a, FIG. 5B shows a display example of the time limit setting screen 422b, and FIG. 5C shows a display example of number-of-sheets limit setting screen 422c.

The user selects his/her desired restriction item with the use of the restriction item selecting screen in step S103, and then, in step S104, sets a specific limit value for the selected restriction item with the use of the restriction item setting screen 422a, 422b, or 422c which is displayed on the touch panel 422 corresponding to the restriction items.

More specifically, for setting the "amount limit", the user uses the amount limit setting screen 422a shown in FIG. 5A to enter a limit amount, for example 200 yen, as the limit (desired printing fee) for the print service fee (settlement amount) for the data printing of which is currently instructed, and presses the "ENTER" button.

For setting the "time limit", the user uses the time limit setting screen 422b shown in FIG. 5B to enter a limit time, for example three minutes, as the limit for the printing time of the data (desired printing time), and presses the "ENTER" button.

For setting the "number-of-sheets limit", the user uses the number-of-sheets limit setting screen 422c shown in FIG. 5C to enter a limit number of sheets, for example two sheets, as the limit for the number of sheets to print the data (desired number of printing sheets), and presses the "ENTER" button.

After the restricted print mode is selected in step S103 (YES in step S103), the restricted print controller 411 monitors, during the display of the restriction item setting screen 422a, 422b, or 422c in step S104, whether or not any of the restriction items is set with the use of the restriction item setting screen 422a, 422b, or 422c (step S105).

If any of the restriction items of printing fee, printing time, and number of sheets is set (YES in step S105), the restricted print controller 411 reads the data to be printed printing of which has been instructed in step S101 from the storage 43, and causes the image processing unit 44 to process the data to be printed into data (restricted print data) corresponding to a print-out form satisfying the restriction item(s) set in step 105 (step S106). This processed data is restored in the storage 43.

Subsequently, sample image data (thumbnail image data) is generated from the processed data for each page of the data by changing the resolution and reducing the size. Using the thumbnail image data thus generated, a list of output results (output samples) of the data processed in step S106 is displayed for preview on the touch panel 422 (step S107).

Figure 6:
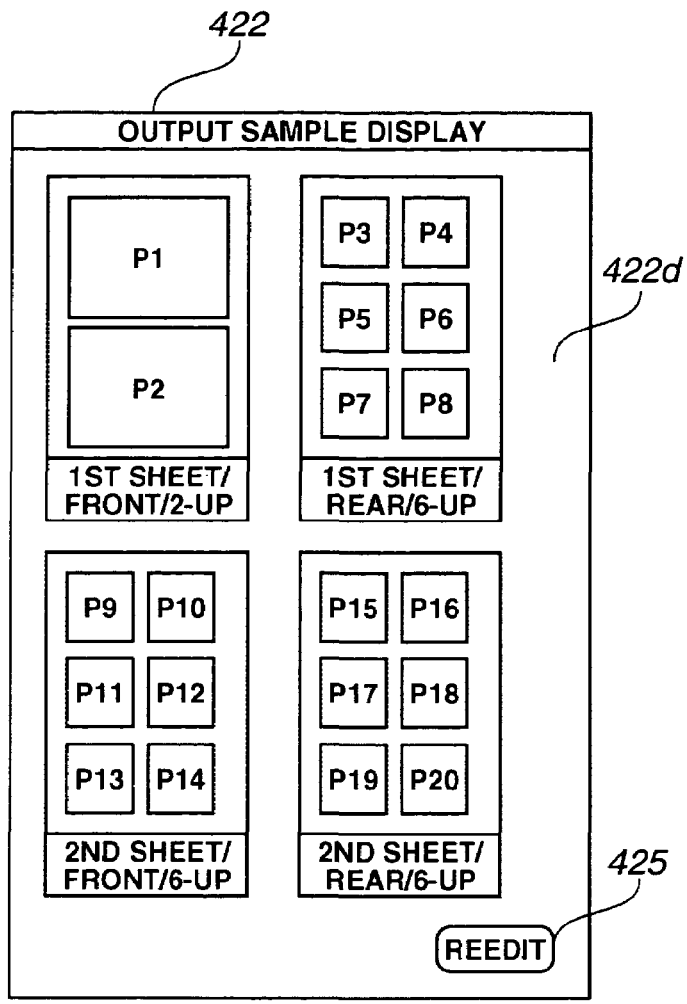
FIG. 6 shows an example of an output sample displayed by the print service apparatus.

FIG. 6 is a drawing showing an example of such output sample displayed by the print service apparatus 40 in step 107.

FIG. 6 particularly shows an example of display of an output sample for the data (restricted print data) processed in step S106 based on the amount limit of 200 yen which is set in step S105 on the data to be printed 20 pages, as described later in more detail. In this example, an output sample (equivalent to an output sample in FIG. 9A) is displayed in a list form as an output sample display screen 422d on the touch panel 422, wherein the first- and second-page data of the data to be printed are printed in two-up form on the front side of a first sheet of paper, and the third- to eighth page data are printed in six-up form on the rear side of the same sheet of paper. The ninth- to 14th page data and the 15th to 20th data are printed in six-up form on the opposite sides of the second sheet of paper, respectively.

If the user, viewing this output sample, determines to print the data in the same form as the displayed output sample, the user may press the "print start" button which is arranged in the key operation unit 421 of the operation/display unit 42 (see FIG. 3) to execute the print processing on the processed data currently available.

In contrast, if the user wants to print the data in a different form from the displayed output sample, the user may press the "reedit" button 425 which is displayed on the output sample display screen 422d together with the output sample. Thereby, the output sample can be reedited for each page with the use of a changing item selecting screen 422e shown in FIG. 7 which is displayed on the touch panel 422 together with the output sample display screen 422d, as described later in detail.

The restricted print controller 411 monitors, during the display of the output sample in step S107, whether or not the print start operation (operation to press the "print start" button) is performed (step S108).

If the print start operation is performed (YES in step S108), the restricted print controller 411 displays on the touch panel 422 a settlement guidance screen showing a print service fee and payment operation guidance (step S111).

When the user has completed the payment operation following the payment operation guidance, the settlement processing of the print service fee is executed (step S112).

The settlement processing apparatus 47 connected to the print service apparatus 40 is provided with a money slot and an electronic money reader. The settlement processing is performed when money (of an amount corresponding to the print service fee) is inserted in the money slot, or the electronic money reader senses proximity of an electronic money holding medium (e.g., mobile phone terminal with electronic money function, or electronic money card). In case of the electronic money payment, the settlement processing is performed by subtracting the print service fee and rewriting the data in the electronic money holding medium.

Upon completion of the settlement processing (YES in step S113), the restricted print controller 411 reads out the processed data corresponding to the output sample displayed in step S107 from the storage 42, and transmits the data to the printer 50 together with a print instruction (step S114).

Upon receiving the print instruction, the printer 50 prints out based on the print data (processed data, or restricted print data) received together with the print instruction from print service apparatus 40.

In the example shown here, the print service apparatus 40 receives the data processed in step S106. The printer 50 prints out this data to be printed consisting of 20 pages of data in a form where the first- and second-page data are printed in two-up form on the front side of a first sheet of paper, third- to eighth-page data are printed in six-up form on the rear side of the same sheet of paper, ninth- to 14th-page data and 15th- to 20th-page data are printed in six-up form on the opposite sides of a second sheet of paper, respectively. This print out form corresponds to the output sample displayed in step S107.

In contrast, if no print start operation is performed during the display of the output sample in step S107 (NO in step S108), the restricted print controller 411 proceeds to the processing for accepting a setting change operation of the user to change the print settings (print control parameters) for the processed data corresponding to the output sample.

For changing the print settings, the user presses a "reedit" button 425 displayed on the touch panel 422 together with the output sample.

Figure 7:
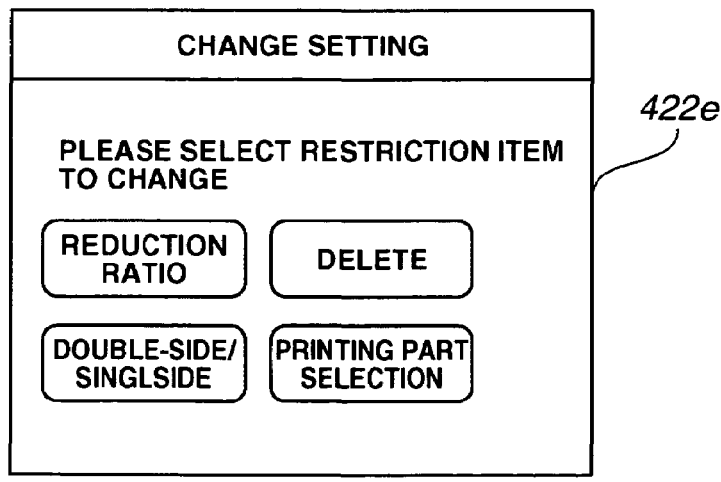
FIG. 7 shows an example of a screen display to select an item to change setting, displayed by the print service apparatus.

Upon the "reedit" button 425 being pressed, the restricted print controller 411 displays on the touch panel 422 as shown in FIG. 7, a changing item selecting screen 422e which includes, for example, a "change reduction ratio" button, a "delete" button, a "double-sided/single-sided print" button, and an "printing part selection" button. If any of these buttons is pressed on the changing item selecting screen 422e, the restricted print controller 411 performs the processing, using an appropriate menu screen, to accept entry of conditions for changing the reduction ratio, deleting data, selecting double-sided or single-sided printing, or selecting a part of the data to be printed, according to the pressed button.

This allows the user to selectively press any of the "change reduction ratio" button, the "delete" button, the "double-sided/single-sided print" button, and the "printing part selection" button on the changing item selecting screen 422e, and then to perform a setting change operation for the processed data corresponding to the output sample, with the use of the menu screen, to change the reduction ratio for a specific page, to delete a specific page, to set the applicability or non-applicability of the double-sided printing mode for a specific page, and to select a specific part of a specific page.

If no print start operation is performed during the display of the output sample (NO in step S108), the restricted print controller 411 monitors whether or not the user has, after pressing the "reedit" button 425, performed the setting change operation for the processed data corresponding to the current output sample by selectively pressing the "change reduction ratio" button, the "delete" button, the "double-sided/single-sided print" button, or the "printing part selection" button (step S109).

If the setting change operation is performed relating to one or more of the scale reduction, page deletion, double-sided or single-sided printing, and printing part selection (YES in step S109), the restricted print controller 411 recognizes the content of the change in the setting, and performs setting change processing according to the content of the change (to change the reduction ratio of the pages, delete specific pages, to set double-sided or single-side printing for each page, or to select a specific part of the data) on the processed data corresponding to the output sample to reprocess (secondarily process) the processed data. The restricted print controller 411 then returns to step S107 and carries on the similar processing.

Specifically, upon returning to step S107, the restricted print controller 411 generates thumbnail images of the respective pages from the reprocessed data to be printed (reprocessed data), and displays on the touch panel 422 an output sample corresponding to the reprocessed data in a list form. This means that the display on the output sample display screen 422d (see FIG. 6) is switched over from the output sample corresponding to the primary processed data (restricted print data) to the output sample corresponding to the secondary processed data. If the print start instruction is not given during the display of the output sample (NO in step S108), the restricted print controller 411 further determines whether or not any setting change is performed on the reprocessed data (step S109). Every time a setting change is performed (YES in step S109), the processed data is reprocessed based on the content of the setting change (step S110).

If the print start operation is performed in step S108 (YES in step S108) while the restricted print controller 411 is continuing this series of processing steps, the restricted print controller 411 proceeds to the settlement processing (steps S111 to S113) before reading the reprocessed data corresponding to the output sample currently displayed from the storage 42, and transmitting the read data to the printer 50 together with a print instruction (step S114).

The printer 50 receives in step S110 the data which has been reprocessed by the print service apparatus 40 according to the setting change in step S109, and prints out the received data. The output result thus obtained reflects the content of the setting change, and differs from the output result which would be obtained if the data is printed out after the primary processing without changing any setting.

The restricted print processing operation of the print service apparatus 40 according to the present invention will now be described in more detail, while giving specific examples of the restriction items.

In the following description, it is assumed that the print service apparatus 40 is designed to basically perform double-sided printing on A4-size paper, and previously holds, in the storage 42, printing restriction conditions that the basic print service fee for double-sided printing is 100 yen per sheet, and the printing time is one minute per sheet.

Figure 8:
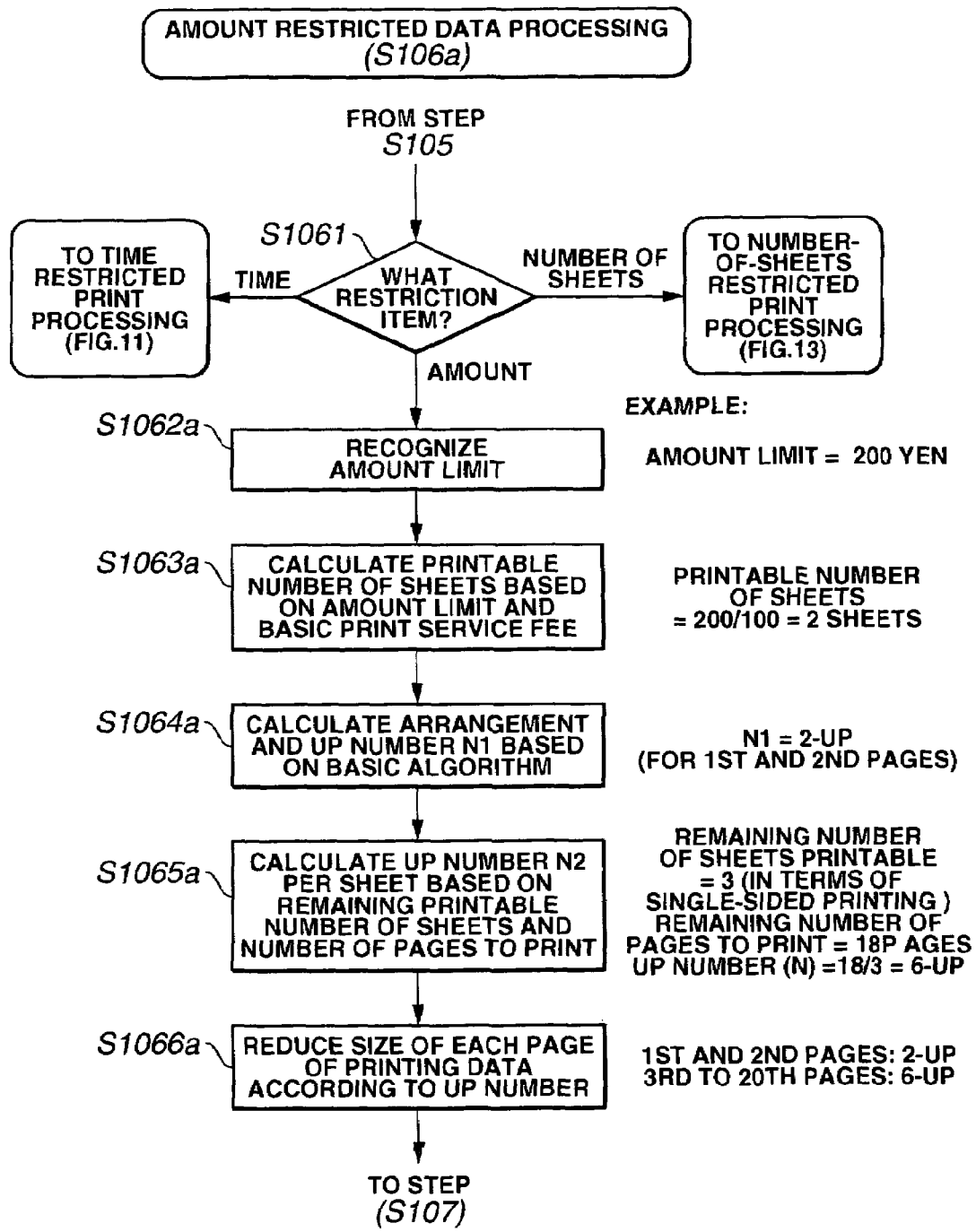
FIG. 8 is a flowchart illustrating a data processing operation when an amount limit is set.

FIG. 8 is a flowchart illustrating a data processing operation which is performed when "amount limit" is selected as the restriction item. It particularly shows details of the data processing performed in step S106 (to be referred to as S106a, for descriptive purposes) on the data 20 pages, for example, printing of which is instructed in step S101 in FIG. 4, when the amount limit of 200 yen is set for this data after the "amount restriction" button is pressed in step S105.

In this data processing (step S106a), the restricted print controller 411 determines, based on the "amount restriction" button being pressed in step S105, that the selected restriction item is the settlement amount ("AMOUNT" in step S1061), and then recognizes the value of the amount limit (200 yen in this example) which is set with the use of the amount limit setting screen 422a (step S1062a).

Whereas, if it is determined during this processing that the selected restriction item is the printing time on the basis of the fact that the "time restriction" button is pressed in step S105 ("TIME" in step S1061), the restricted print controller 411 proceeds to the time restriction data processing to be described later (see FIG. 11). If it is determined that the selected restriction item is the number of sheets based on the fact that the "number-of-sheets restriction" button is pressed, the restricted print controller 411 proceeds to the number-of-sheets restriction data processing (see FIG. 13).

Subsequently, the restricted print controller 411 calculates the printable number of sheets based on the amount limit (200 yen) recognized in step S1062a and the previously stored basic print service fee (100 yen per sheet for double-sided A4 printing), by dividing 200 by 100, and obtains the result of two sheets (200/100=2), or four sheets in terms of single-sided printing (step S1063a).

The restricted print controller 411 then calculates, based on a previously set basic algorithm, which page is to be arranged in which side of each sheet of the printable number of sheets in what reduction ratio (up number N1) (step S1064a).

In this example, the previously set basic algorithm is such that the first- and second-page data to be printed are printed in two-up form on one side of the first paper.

After determining the up number N1 based on the basic algorithm, the restricted print controller 411 calculates the remaining printable number of sheets by subtracting 1 from 4 to obtain the result of three sheets in terms of single-sided printing, and calculates the remaining number of pages to be printed by subtracting 2 from 20 to obtain the result of 18 pages. Based on the remaining printable number of sheets and the remaining number of pages to be printed thus obtained, the restricted print controller 411 then calculates the up number N2, or the number of pages that can be arranged evenly in each sheet of the printable number of sheets by dividing 18 by 3 to obtain the result of 6-up (step S1065a).

Further, the restricted print controller 411 transfers the data to be printed to the image processing unit 44 so that the first- and second-page data of the data to be printed are processed into data conforming to the up number N1 (2-up) determined in step S1064a and the data of remaining pages to be printed are processed into data conforming to the up number N2 (6-up) obtained in step S1065a (step S1066a).

Figure 9A:
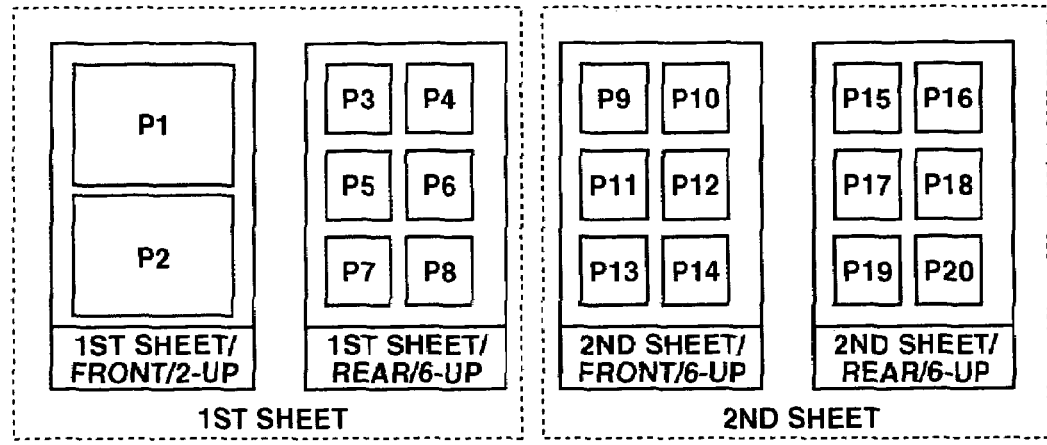
FIGS. 9A and 9B are schematic diagrams respectively showing display of an output sample and an output result obtained based on the data processing of FIG. 8.

After the series of data processing steps based on the set amount limit (of 200 yen) has been performed in step S106a, an output sample as shown in FIG. 9A, for example, is displayed on the output sample display screen 422d of the touch panel 422 based on the processed data, during data processing in step S107.

It should be noted that, in FIGS. 9A and 9B, and FIGS. 10A and 10B, FIGS. 12A and 12B, and FIGS. 14A and 14B to be described later, the notation "pn" refers to a thumbnail image (or output image) corresponding to the n-th page data.

As can be seen from FIG. 9A illustrating the output sample display which is represented with the thumbnail images corresponding to the respective pages of the data to be printed, the first- and second-page data of the data to be printed are arranged on the front side of the first sheet of paper in two-up form, and the third- to eighth-page data are arranged on the rear side in six-up form. Further, the ninth- to 14th-page data and the 15-th to 20th-page data are arranged on the opposite sides of the second sheet of paper in six-up form, respectively.

Figure 9B:
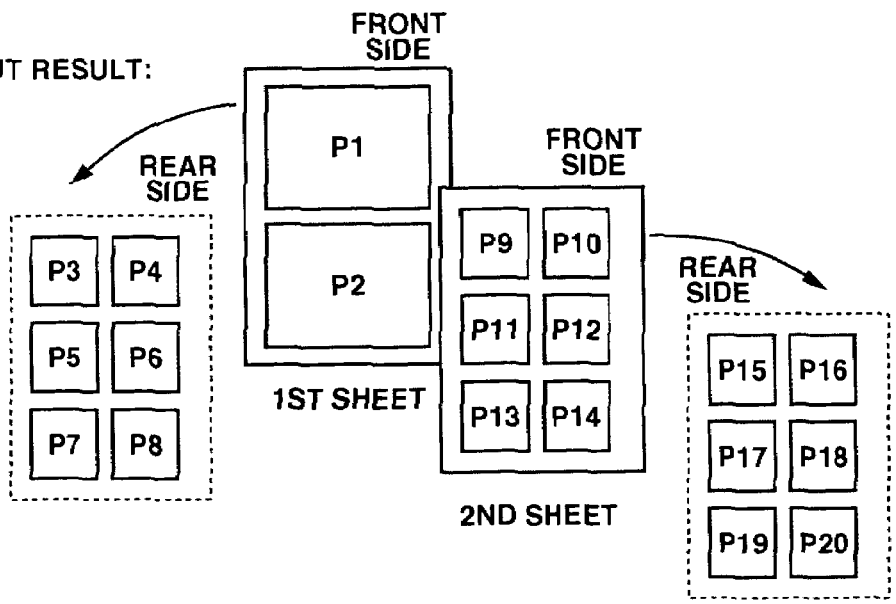

If the print start operation is performed in step S108 during the display of this output sample, the printer 50 prints, based on the processed data corresponding to the output sample transmitted from the print service apparatus 40, the first- and second-page data of the data to be printed on the front side of the first sheet of paper in two-up form, the third- to eighth-page data on the rear side in six-up form, and the ninth- to 14th-page data and the 15th- to 20th-page data on the opposite sides of the second sheet of paper in six-up form, respectively, as shown in FIG. 9B.

If the user, viewing the output sample display, is not satisfied with the output result as shown in the output sample display for some reason, such as the print image of a specific page being too small, the user may perform a setting change operation in the subsequent step S109 to change the reduction ratio for a specific page, or to delete any unnecessary page. If this is done, secondary processed data which is secondarily processed based on the content of the setting change is generated in the subsequent step S110, and an output sample based on the secondary processed data is displayed in step S107 on the output sample display screen 422d.

If the user, viewing the output sample of the secondary processed data reflecting the setting change, is satisfied with the output form, the user may perform the print instruction operation to cause the printer 50 to print out in a form exactly according to the output sample based on the secondary processed data reflecting the setting change.

Figure 10A:
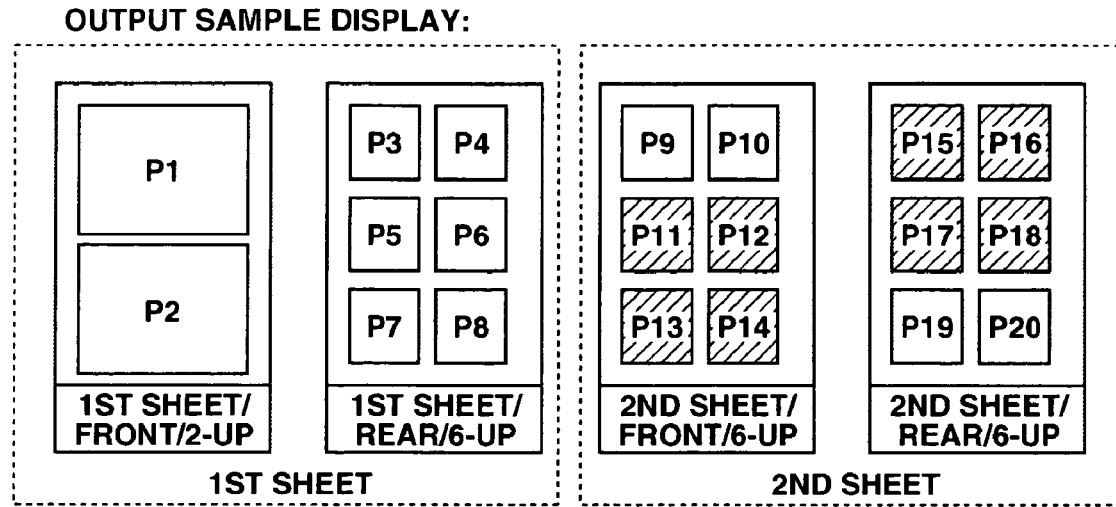
FIG. 10A is a schematic diagram illustrating an operation to reedit the output sample in FIG. 9A.
Figure 10B:
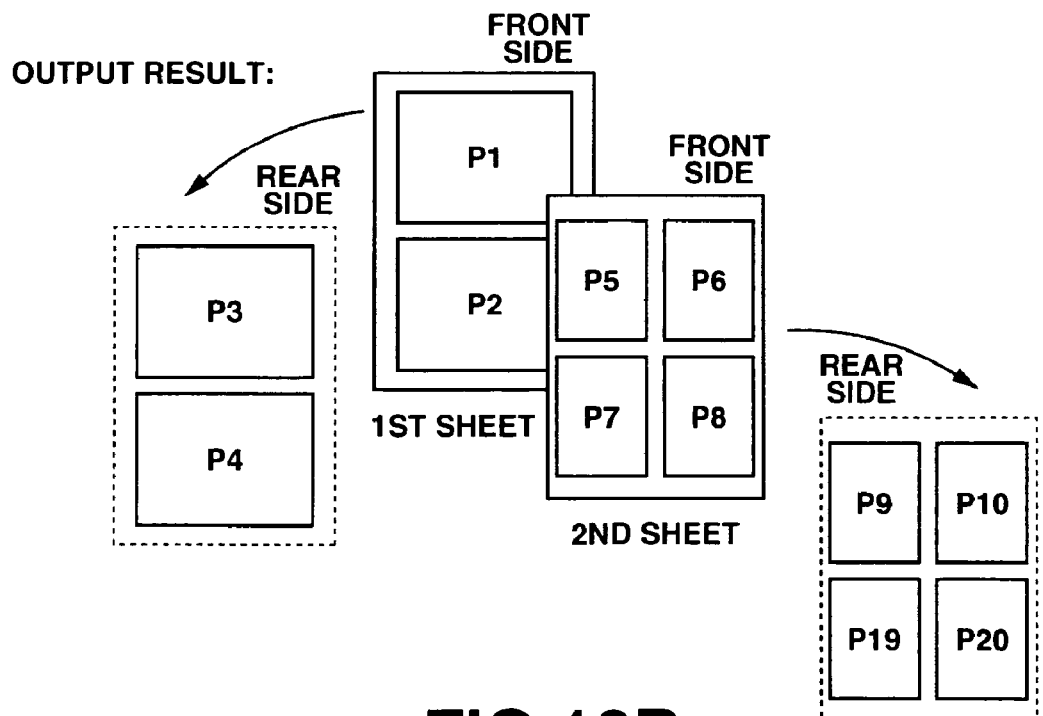
FIG. 10B is a schematic diagram illustrating an output result obtained after the reediting.

By way of an example, FIG. 10A shows a way in which the setting change operation is performed while viewing the output sample display in FIG. 9A. The setting change operation specifically includes the deletion of the 11th- to 14th-page data arranged on the front side of the second sheet and the 15th- to 18th-page data arranged on the rear side of the second sheet (those pages shaded in FIG. 10A), and the change in reduction ratio of the remaining pages. FIG. 10B shows a way in which, based on the secondary processed data reflecting the setting change performed by the setting change operation illustrated in FIG. 10A, the printer 50 prints out the first- to fourth-page data of the data to be printed on the opposite sides of the first sheet of paper in two-up form, respectively, and the fifth- to tenth-page, and 19th- and 20th-page data on the opposite sides of the second sheet of paper in four-up form.

The amount restricted print processing as described above enables the user to obtain print out of all the pages of the data to be printed in the output form, for example, as shown in FIG. 9B by setting his/her desired limit for the printing fee according to the amount of cash money the user has in hand. If the user wants to obtain print-out in a different form, the user may further change the setting appropriately to secondarily process the data. The user is also able to obtain print-out of specific pages in a larger size as shown in FIG. 10B, for example, by deleting other unnecessary pages. Thus, the user is allowed to obtain print-out in an output form closer to his/her most desirable one with the limited amount of cash money in hand, by setting the amount limit and, if necessary, changing other settings.

Figure 11:
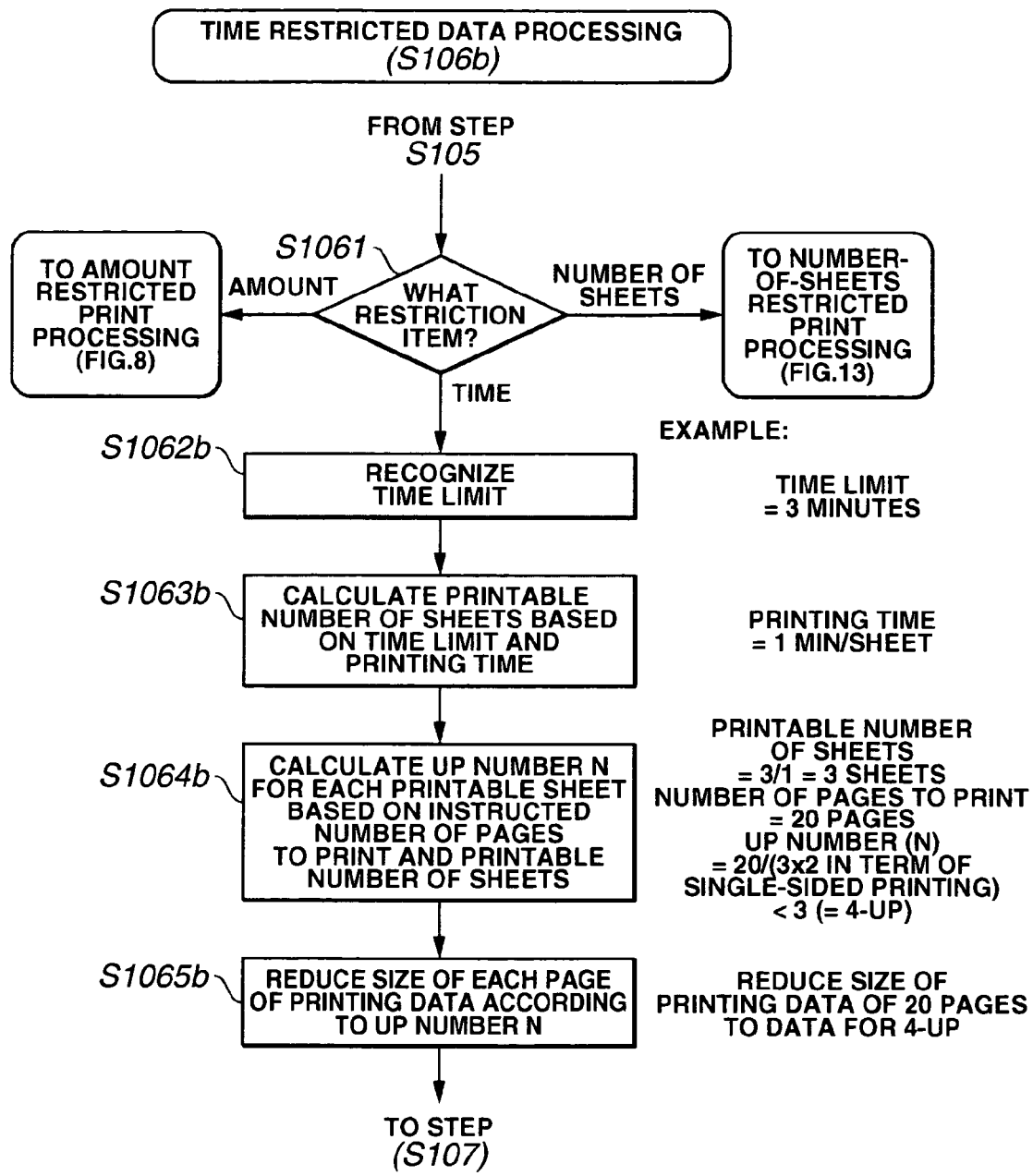
FIG. 11 is a flowchart illustrating a data processing operation when a time limit is set.

FIG. 11 is a flowchart illustrating a data processing operation which is performed when "time limit" is selected as the restriction item. This flowchart particularly illustrates a detailed processing operation performed in step S106 of FIG. 4 (to be referred to as step S106b, for descriptive purposes) when, in step S105, after the pressing of the "time restriction" button, the time limit is set to three minutes for the data of 20 pages, the printing of which is instructed in step S101 (the same data as when the amount restriction processing is performed).

In this data processing (step S106b), the restricted print controller 411 first determines in step S105, based on the pressing of the "time restriction" button, that the selected restriction item is the "printing time" (TIME in step S1061). The restricted print controller 411 then recognizes a value of the time limit (three minutes, in this example) that is set by means of the time limit setting screen 422b (step S1062b).

Subsequently, the restricted print controller 411 calculates the printable number of sheets based on the time limit recognized in step S1062b (three minutes) and the previously stored printing time (one minute per sheet in double-sided printing) by dividing three by one to obtain the result of three sheets (3/1=3), or 6 sheets in terms of single-sided printing (step S1063b).

The restricted print controller 411 then calculates, based on the printable number of sheets thus obtained (three sheets, or six sheets in terms of single-sided printing) and the number of pages of the data to be printed (the number of pages to be printed, or 20 pages), the number of pages which can be evenly arranged on each of the printable sheets, or the up number N by dividing 20 by 6 to obtain the result of three pages or more (20/6<3), or the up number of four (four-up) (step S1064b).

Further, the restricted print controller 411 transfers the data to be printed to the image processing unit 44 so that the data of each page of the data to be printed is processed to data conforming to the up number N (four-up) obtained in step S1064b above (step S1065b).

Figure 12A:
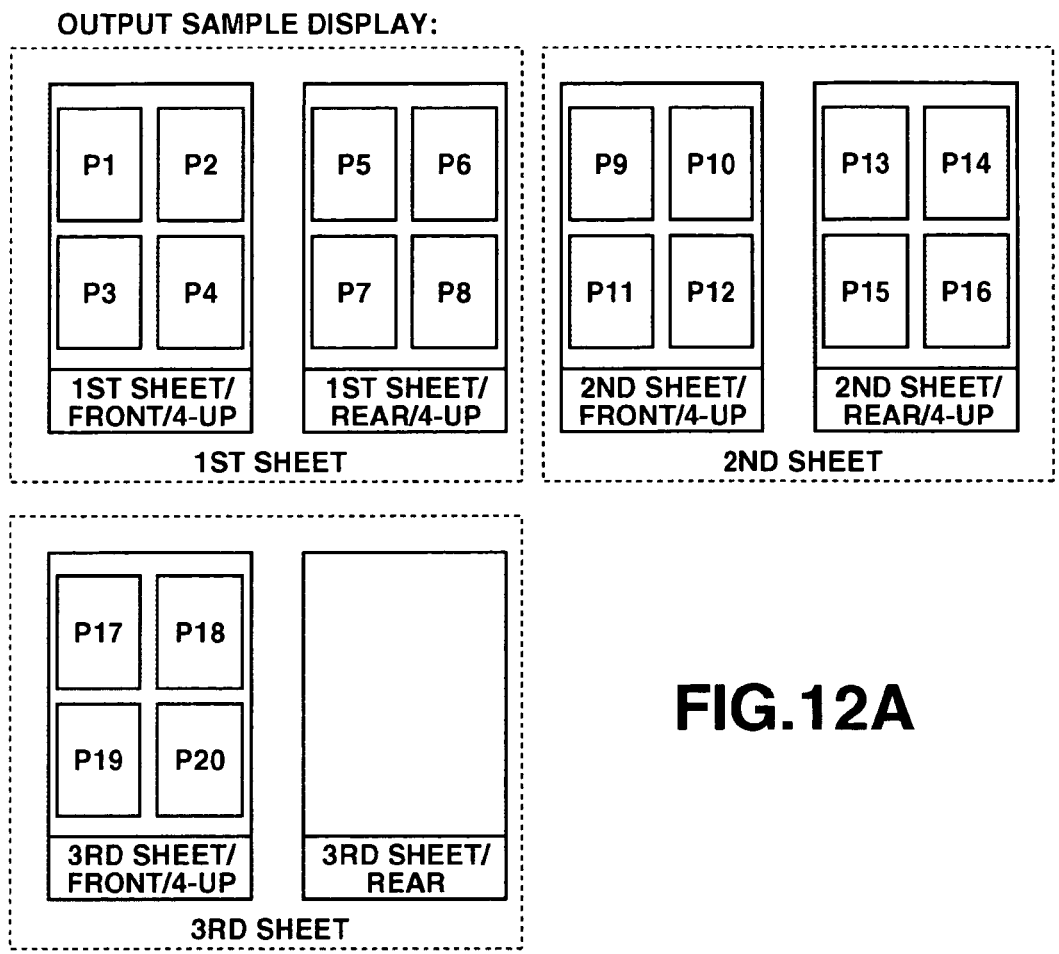
FIGS. 12A and 12B are schematic diagrams respectively showing display of an output sample and an output result obtained based on the data processing of FIG. 11.

As a result of this series of data processing steps performed in step S106b based on the set time limit of three minutes, an output sample as shown in FIG. 12A, for example, is displayed, based on the processed data, on the touch panel 422 in the following data processing in step S107.

The output sample in FIG. 12A displays the way in which the first- to 20th-page data of the data to be printed are sequentially arranged in four-up form on the opposite sides of the first to third sheet of paper, by means of thumbnail images corresponding to the respective pages.

Figure 12B:
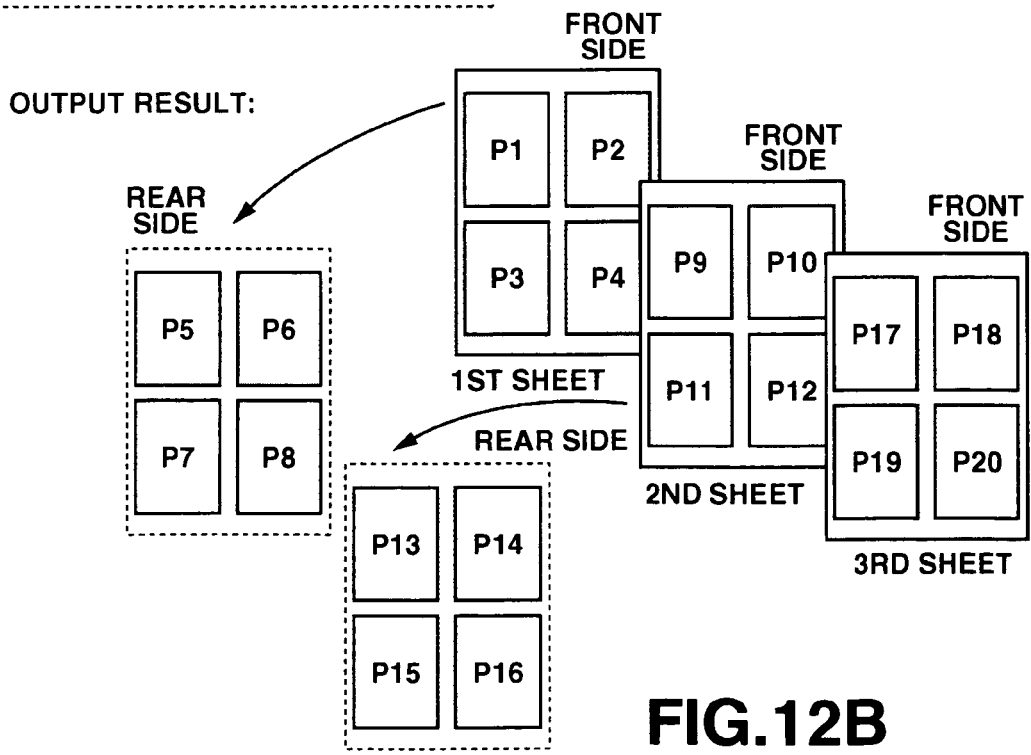

If the print start operation is performed in step S108 during the display of the output sample, the printer 50 sequentially prints out, based on the processed data corresponding to the output sample and transmitted from the print service apparatus 40, the first- to eighth-page data of the data to be printed on the front and rear sides of the first sheet of paper in four-up form, then ninth- to 16th-page data of the data to be printed on the front and rear sides of the second sheet of paper in four-up form, and further the 17th- to 20the-page data of the data to be printed on the front side of the third sheet of paper in four-up form, as shown in FIG. 12B.

If the user, viewing the output sample display, is not satisfied with the output result of the output sample display, the user may perform a setting change operation in the subsequent step S109 to change the reduction ratio for specific pages or to delete unnecessary pages, for example. If this is done by the user, secondary processed data is generated in the subsequent step S110 based on the content of the setting change. Further, in step S107, an output sample revised based on the secondary processed data is displayed on the touch panel 422. If a print instruction operation is performed at this point of time, the printer 50 executes the print-out exactly according to the output sample based on the secondary processed data reflecting the setting change, in the same way as the above-described print processing operation when the amount limit is set.

According to the time restricted print processing described above, the user is allowed to set his/her desired time limit for printing the data so that the user is able to obtain print-out of all the pages of the data to be printed within the time limit in an output form, for example, as shown in FIG. 12B. Therefore, even when the user has only a short time available such as a short waiting time for transportation, the print-out can be completed within the short time.

Additionally, if the user set the time limit with some extra time, the user will be able to have a time for checking the output sample display based on the primary processed data to change some settings, if necessary. In this case, the user is allowed to obtain a print-out in a more desirable form based on the secondary processed data reflecting the setting change.

Figure 13:
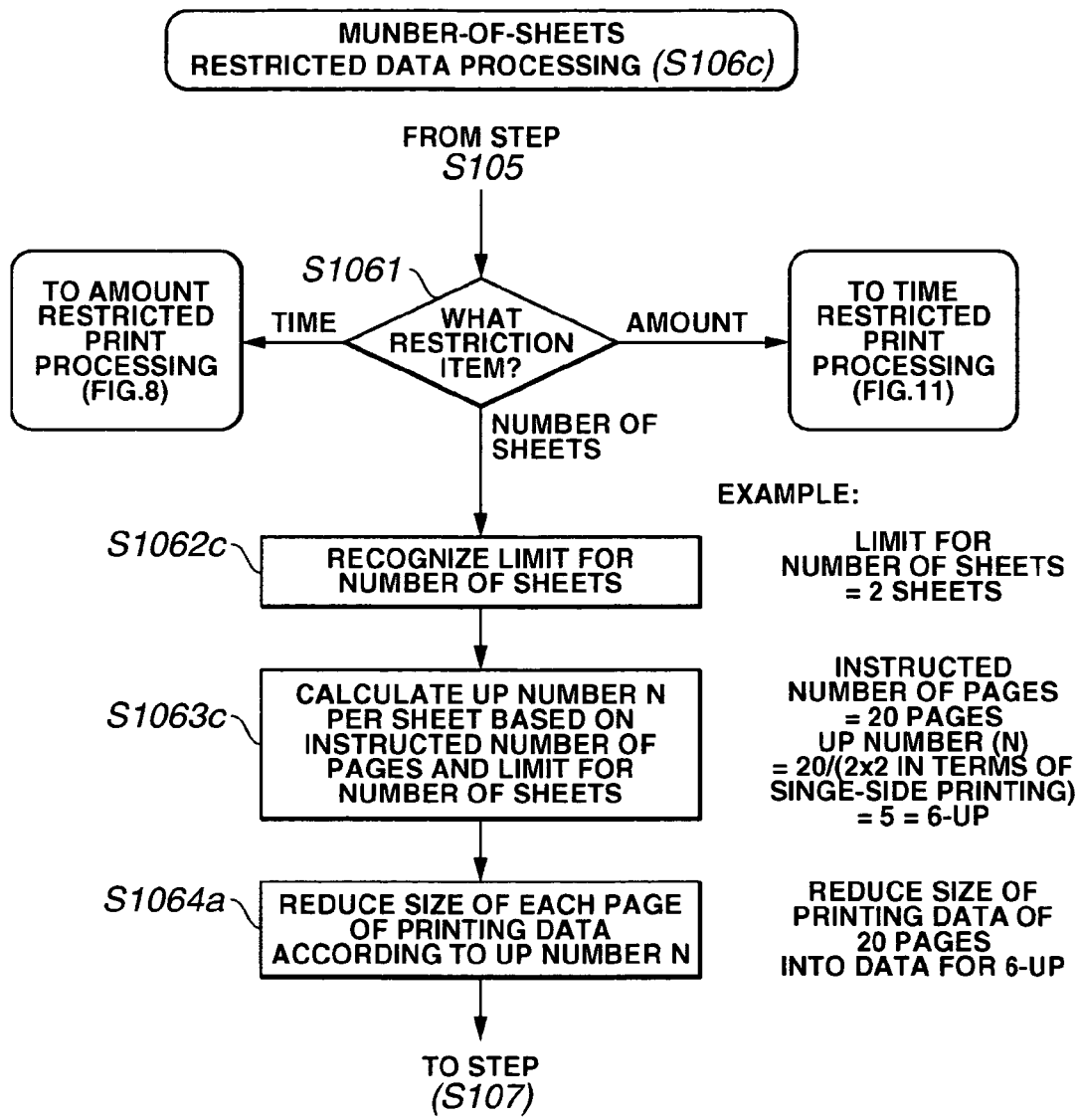
FIG. 13 is a flowchart illustrating a data processing operation when a limit is set for the number of sheets of paper.

FIG. 13 is a flowchart illustrating a data processing operation which is performed when "number-of-sheets limit" is selected as the restriction item. This flowchart particularly illustrates a detailed data processing (to be referred to as S106c for descriptive purposes) performed in step S106 when, in step S105, after the pressing of the "number-of-sheets restriction" button, the limit for the number of sheets is set to two sheets for the data of 20 pages, printing of which is instructed in step S101 in FIG. 4 (the same data as in the amount restriction data processing).

In the data processing (step S106c), the restricted print controller 411 first determines, based on the pressing of the "number-of-sheets restriction" button in step S105, that the restriction item is the number of sheets ("NUMBER OF SHEETS" in step S1061). The restricted print controller 411 then recognizes the limit for the number of sheets (two sheets, in this example) set by means of the number-of-sheets limit setting screen 422c (step S1062c).

Subsequently, the restricted print controller 411 calculates, based on the limit for the number of sheets recognized in step S1062c above (two sheets, or four sheets in terms of single-sided printing) and the number of pages of the data to be printed (the number of pages of data to be printed, or 20 pages), the number of pages of the data to be printed which can be evenly arranged on each sheet of the printable number of sheets, or the up number N, by dividing 20 by 4 to obtain the result of 5 pages (20/4=5), or the count number of six (six-up) (step S1063c).

Further, the restricted print controller 411 transfers the data to be printed to the image processing unit 44 so that each page data of the data to be printed is processed into data conforming to the up number N (six-up in this example) calculated in the step S1063c above (step S1064c).

Figure 14A:
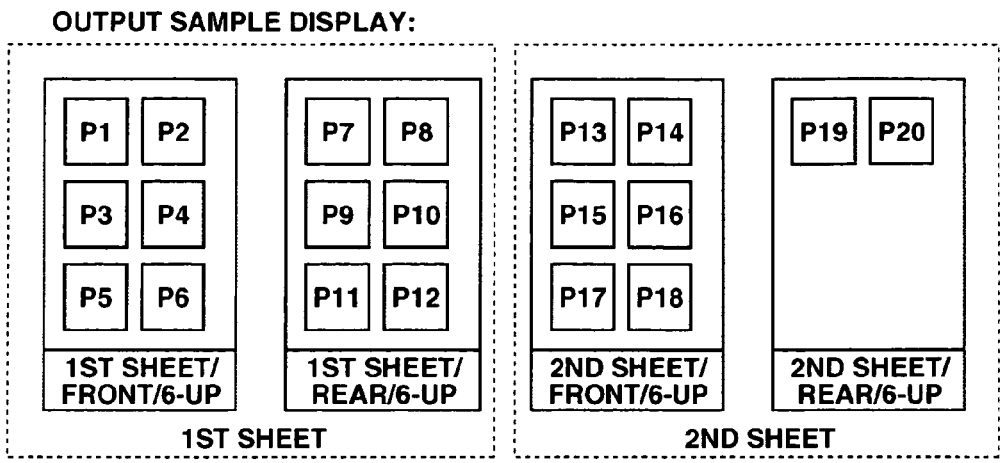
FIG. 14A is a schematic diagram illustrating display of an output sample obtained based on the data processing of FIG. 13.

As a result of a series of the data processing steps based on the setting of the limit for number of sheets (two sheets) in step S106c, an output sample is displayed on the output sample display screen 422d of the touch panel 422 based on the processed data, for example, as shown in FIG. 14A, during the data processing in step S107.

As shown in FIG. 14A, the output sample display shows the way in which the first- to 20th-page data of the data to be printed are sequentially arranged on the front and rear sides of the first and second sheets of paper in six-up form, by means of thumbnail images corresponding to the respective pages.

If the print start operation is performed in step S108 during the display of the output sample, the printer 50 sequentially prints out, based on the processed data corresponding to the output sample and transmitted from the print service apparatus 40, the first- to 12th-page data of the data to be printed on the front and rear sides of the first sheet of paper in six-up form, the 13th- to 18th page data of the data to be printed on the front side of the second sheet of paper in six-up form, and the 19th- and 20th-page data on the rear side thereof in 6-up form, exactly according to the output sample shown in FIG. 14A.

Whereas, if the user, viewing the output sample display, is not satisfied with the output result of the output sample, the user may perform a setting change operation in the subsequent step S109, for example, to change the reduction ratio for specific pages or to delete unnecessary pages. When this is done by the user, secondary processed data is generated in the subsequent step S110 based on the content of the setting change, and a revised output sample based on the secondary processed data is displayed on the touch panel 422 in step S107.

If the user, viewing the revised output sample based on the secondary processed data reflecting the setting change, is satisfied with the output form and performs the print instruction operation at this point of time, the printer 50 prints out the data in the form exactly according to the output sample based on the secondary processed data reflecting the setting change.

Figure 14B:
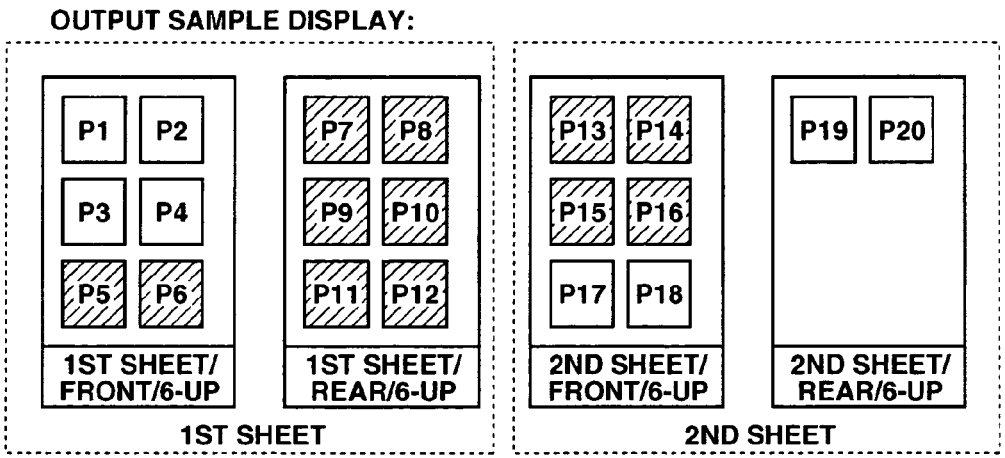
FIG. 14B is a schematic diagram illustrating an operation to reedit the output sample in FIG. 14B.

By way of example, FIG. 14B shows a way in which setting change operations are performed while viewing the output sample display shown in FIG. 14A. The setting change operations include an operation to delete the fifth and sixth pages arranged on the front side of the first sheet of paper, the seventh to 12th pages arranged on the rear side of the first sheet of paper, and the 13th to 16th pages arranged on the front side of the second sheet of paper (the shaded pages in FIG. 14B), and an operation to change the setting of the reduction ratio for the remaining pages.

Figure 14C:
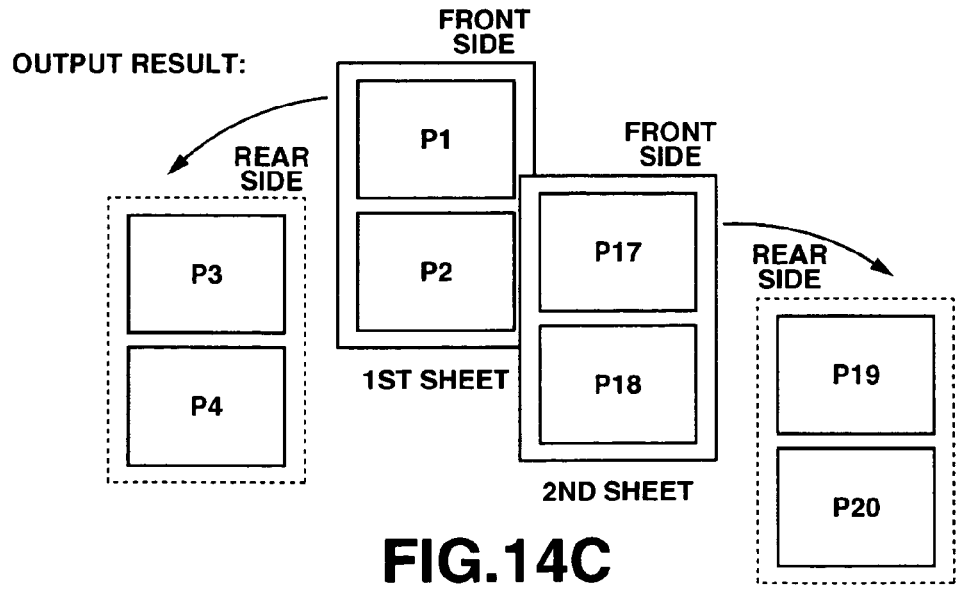
FIG. 14C is a schematic diagram illustrating an output result obtained after the reediting.

FIG. 14C shows a way in which the printer 50 prints out, based on the secondary data reflecting the setting changes as illustrated in FIG. 14B, the first- to fourth-page data of data to be printed in two-up form on the front and rear sides of the first sheet of paper, and 17th- to 20th-page data in two-up form on the front and rear sides of the second sheet of paper.

According to the number-of-sheets restricted print processing as described above, the user is allowed to set his/her desired number of sheets so that the user is able to obtain a print-out of the data in the number of sheets thus set. Therefore, even when the user is already carrying a heavy load and does not want to carry too many sheets of printed paper, the user is able to obtain print-out in a minimum number of sheets and yet in a desirable form.

Moreover, according to the present invention, the sample of the print out result is displayed to the user before executing the print-out. If the user is not satisfied with the print out result in the sample, the data is secondarily processed by reflecting changes in the setting, such as changing the reduction ratio for specific pages, deleting unnecessary pages, changing the setting of double-sided and single-sided printing, and selecting specific parts of specific pages to be printed out. Thus, the present invention provides a very useful function that meets the user's demand to obtain a hard print-out of the minimum required data (specific pages) while keeping the number of sheets (or the weight) of printed paper at minimum.

In the amount restricted print control according to the present embodiment (see FIG. 8), the basic algorithm is used to determine the arrangement and the up number of the first- and second-page data before determining the arrangement of the remaining pages according to the printable number of sheets of paper. This basic algorithm is not limited to the one described above but may be set in various patterns.

Further, the basic algorithm need not necessarily be applied in the present invention. Instead, the reduction ratio may be calculated for each page, simply based on the printable number of sheets of paper and the number of pages to be printed.

Conversely, for the time restricted print control (see FIG. 11) and the number-of-sheets restricted print control (see FIG. 13), a basic algorithm (which is however different from the one used for the amount restricted print control) may be used to determine the arrangement and the up number and then the arrangement of the remaining pages is determined according to the remaining printable number of sheets.

In the restricted print control which is performed based on the settings of the restriction items of amount, time, and number of printed sheets as described above, a single output sample is displayed for the data (primary processed data) obtained by processing the data to be printed based on the settings of the restriction items. However, the present invention is not limited to this, and the data to be printed may be processed into plural types of data satisfying the settings of the restriction items, so that plural output samples corresponding to these types of data are displayed. In this case, one of the output samples is selected, and the print-out is performed based on the processed data corresponding to the selected output sample.

To give a specific example, as described in relation to the amount restricted print control of FIG. 8, if the amount limit is set to 200 yen for printing the data of 20 pages, the printable number of sheets of paper is two sheets. Thus, the data to be printed is processed into three types of data: a first type of data which can be printed in six-up form on the both sides of the printable number of sheets of paper, a second type of data which can be printed in the reduction ratio of 100% and in two-up form on the both sides of the sheets with only one-third of each paper being output, and a third type of data which can be printed in the reduction ratio of 20% on the singe side of the sheets with a half of each page being output. Output samples based on these three types of data are displayed to allow the user to select one sample which is closest to his/her desired output form.

In this case, it is of course possible to change the setting of the reduction ratio, the up number N or the like with respect to the selected output sample.

In the above description of the amount restricted print control, the amount limit is set on the assumption that cash money is used as the settlement means. However, other settlement means may be used, and a limit for a value of such settlement means corresponding to the money amount limit may be set as the restriction item.

It should be understood that the present invention is not limited to the specific embodiments described above and shown in the accompanying drawings, but may be otherwise variously embodied without departing from the spirit and scope of the invention.

For example, the present invention is applicable both to monochrome printers and color printers. When the printer is of a type which can be used for both color printing and monochrome printing, the user may be allowed to select either monochrome printing mode or color printing mode, and the printable number of sheets of paper may be calculated based on the selected printed mode in addition to the restriction items described above.

Further, the present invention is not limited to the system configuration shown in FIG. 2 in which the printer 50 is connected to the print service apparatus 40 as a separate entity. Instead, an image forming unit functioning as the printer 50 may be incorporated in the print service apparatus 40.

The present invention is applicable to print processing apparatuses in general which provide a service to print previously stored data for a fee. According to the present invention, restriction items for printing the data can be set before executing the print-out so that the data to be printed is processed into restricted print data corresponding to the print-out form satisfying the set restriction items, and such processed data is printed out. This enables the user to obtain a desirable print-out with a limited amount of money, in a short period of time, or in a small number of sheets, simply by setting the restriction items before the print-out.

As described above, according to an aspect of the present invention, a print processing apparatus that reads and processes data to be printed in response to a print instruction for previously stored data, and prints out the data thus processed by means of an image forming unit after completing settlement processing of a print service fee charged for the printing, comprises a setting unit that sets restriction items relating to the printing of the data to be printed; an image processing unit that processes the data to be printed into restricted print data conforming to a print-out form that satisfies the restriction items set by the setting unit; and a data transmitting unit that transmits the restricted print data processed by the image processing unit to the image forming unit.

According to another aspect of the invention, the print processing apparatus further comprises an output sample display that displays an output sample composed of sample images of respective pages of the restricted print data, wherein the data transmitting unit transmits the restricted print data corresponding to the output sample in response to a predetermined print start instruction operation during the display of the output sample.

According to still another aspect of the invention, the print processing apparatus further comprises a change instructing unit that instructs a change of a print control parameter for the restricted print data corresponding to the output sample during the display of the output sample, wherein the image processing unit reprocesses the restricted print data according to the change instructions by the change instructing unit to generate reprocessed data; the output sample display displays a reprocessed output sample composed of sample images of the respective pages of the reprocessed data reprocessed by the image processing unit; and the data transmitting unit transmits the reprocessed data corresponding to the reprocessed output sample in response to the predetermined print start instruction operation during the display of the reprocessed output sample.

According to even another aspect of the invention, the change instructing unit changes at least one of the print control parameters relating to size reduction, deletion, selection of double-sided or single-sided printing mode, and selection for a specific part to be printed, with respect to a specific page of the restricted print data corresponding to the output sample.

According to yet another aspect of the invention, the restriction item setting unit sets, as the restriction item, a limit for a settlement amount as a fee for printing the data to be printed or a limit for a value corresponding to the settlement amount.

According to even still another aspect of the invention, the restriction item setting unit sets, as the restriction item, a limit for a printing time of the data to be printed.

According to yet still another aspect of the invention, the restriction item setting unit sets, as the restriction item, a limit for the number of sheets of paper to print the data to be printed.

According to even yet another aspect of the invention, a print processing apparatus that reads and processes data to be printed in response to a print instruction for previously stored data, and prints out the data thus processed by means of an image forming unit after completing settlement processing of a print service fee charged for the printing, comprises a setting unit that sets restriction items relating to the printing of the data to be printed; an image processing unit that processes the data to be printed into restricted print data conforming to a print-out form that satisfies the restriction items set by the setting unit; an output sample display that displays a plurality of output samples each composed of sample images of respective pages of each of the plurality of types of restricted print data processed by the image processing unit; a selecting unit that selects one of the plurality of output samples displayed by the output sample display; and a data transmitting unit that transmits the restricted print data corresponding to the output sample selected by the selecting unit, to the image forming unit.

According to further aspect of the invention, the print processing apparatus further comprises a change instructing unit that instructs a change of a print control parameter for the restricted print data corresponding to the output sample selected by the selecting unit, wherein the image processing unit reprocesses the restricted print data according to the print parameters changed by the change instructing unit to generate reprocessed data; the output sample display displays a reprocessed output sample composed of sample images of the respective pages of the reprocessed data that is reprocessed by the image processing unit; and the data transmitting unit transmits the reprocessed data corresponding to the reprocessed output sample in response to the predetermined print start instruction operation during the display of the reprocessed output sample display.

According to still further aspect of the invention, the change instructing unit changes at least one of the print control parameters relating to size reduction, deletion, selection of double-sided or single-sided printing mode, and selection for a specific part to be printed, with respect to a specific page of the restricted print data corresponding to the output sample.

According to even further aspect of the invention, the restriction item setting unit sets, as the restriction item, a limit for a settlement amount as a fee for printing the data to be printed or a limit for a value corresponding to the settlement amount. According to yet further aspect of the invention, the restriction item setting unit sets, as the restriction item, a limit for a printing time of the data to be printed. According to further aspect of the invention, the restriction item setting unit sets, as the restriction item, a limit for the number of sheets of paper to print the data to be printed.

According to yet further aspect of the invention, a print processing method that is implemented in a print processing apparatus that reads and processes data to be printed in response to a print instruction for previously stored data, and prints out the data thus processed by means of an image forming unit after completing settlement processing of a print service fee charged for the printing, comprises setting, by a setting unit of the print processing apparatus, restriction items relating to the printing of the data to be printed; processing, by an image processing unit of the print processing apparatus, the data to be printed into restricted print data conforming to a print-out form that satisfies the restriction items set by the setting unit; and transmitting, by a data transmitting unit of the print processing apparatus, the restricted print data processed by the image processing unit to the image forming unit.

According to even yet further aspect of the invention, in the setting of the restriction item, a limit for a settlement amount as a fee for printing the data to be printed or a limit for a value corresponding to the settlement amount.

According to yet even further aspect of the invention, in the setting of the restriction item, a limit for a printing time to print the data to be printed is set as the restriction item.

According to even yet still further aspect of the invention, in the setting of the restriction item, a limit for the number of printing sheets of paper to print the data to be printed is set as the restriction item.

The forgoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-34497 filed on Feb. 10, 2005 including specification, claims, drawings and abstract is incorporated herein by reference in its entirety.

What is claimed is:

1. A print processing apparatus comprising:
   a data-to-be-printed storage unit that stores data to be printed;
   a data-to-be-printed reading unit that reads the data to be printed from the data-to-be-printed storage unit based on a print instruction;
   a restriction setting unit that sets restriction settings to restrict a print service fee to be charged for printing the data to be printed read by the data-to-be-printed reading unit;
   a data-to-be-printed processing unit that processes the data to be printed, the process modifying the data to be printed into print data according to an algorithm, such that the print data, when charged for, does not exceed the restricted print service fee;
   a print service fee settlement processing unit that performs settlement processing of a print service fee charged for the print data processed by the data-to-be-printed processing unit; and
   a print control unit that transmits the print data processed by the data-to-be-printed processing unit to a print processing unit and performs print control after completing the settlement processing by the print service fee settlement processing unit.

2. The print processing apparatus according to claim 1, further comprising:
   a sample image forming unit that forms sample images corresponding to print images of respective pages based on the print data processed by the data-to-be-printed processing unit;
   a sample image display control unit that displays and controls on a display sample images of respective pages formed by the sample image forming unit; and a print start instruction entering unit that enters print start instruction of images corresponding to the sample images based on the sample images displayed on the display by the sample image display control unit;

wherein the print control unit transmits the print data processed by the data-to-be-printed processing unit to the print processing unit based on the entering of the print start instruction by the print start instruction entering unit and performs the print control.

3. A print processing apparatus according to claim 2, further comprising a print control parameter change instructing unit that instructs a change of a print control parameter for the print data corresponding to the sample images displayed on the display by the sample image display control unit, wherein the data-to-be-printed processing unit comprises a reprocessing unit that reprocesses the data to be printed based on the print control parameter to which the change is instructed by the print control parameter change instructing unit; and the sample image forming unit forms sample images of respective pages based on the data to be printed reprocessed by the reprocessing unit.

4. The print processing apparatus according to claim 3, wherein the print control parameter change instructing unit instructs a change in at least one of print control parameters relating to size reduction, deletion, selection of double-sided or single-sided printing mode, and selection for a specific part to be printed, with respect to a specific page of the print data corresponding to the sample images.

5. The print processing apparatus according to claim 1, wherein the restriction setting unit sets a limit for settlement amount corresponding to the print service fee for printing the data to be printed or a limit for a value.

6. The print processing apparatus according to claim 1, wherein the restriction setting unit sets a limit for a printing time for printing the data to be printed.

7. The print processing apparatus according to claim 1, wherein the restriction setting unit sets a limit for the number of sheets of paper for printing the data to be printed.

8. A print processing apparatus comprising:

a data-to-be-printed storage unit that stores data to be printed;

a data-to-be-printed reading unit that reads the data to be printed from the data-to-be-printed storage unit based on a print instruction;

a restriction setting unit that sets restriction settings to restrict billing amount for a print service for printing the data to be printed read by the data-to-be-printed reading unit;

a data-to-be-printed processing unit that processes the data to be printed, the process modifying the data to be printed into a plurality of print data according to a plurality of algorithms, such that the each of the plurality of print data, when charged for, do not exceed the restricted billing amount;

a sample image forming unit that forms a plurality of sample images including print images of respective pages based on the plurality of print data processed by the data-to-be-printed processing unit;

a sample image display control unit that displays and controls on a display the plurality of sample images formed by the sample image forming unit;

a sample image selecting unit that selects one of the plurality of sample images displayed and controlled on the display by the sample image display control unit;

a print service fee settlement processing unit that performs settlement processing of a print service fee charged for the print data corresponding to the sample image selected by the sample image selecting unit; and a print control unit that transmits the print data corresponding to the sample image selected by the sample image selecting unit to a print processing unit and performs print control after completing the settlement processing by the print service fee settlement processing unit.

9. The print processing apparatus according to claim 8, further comprising a print control parameter change instructing unit that instructs a change of a print control parameter for the print data corresponding to the sample image selected by the sample image selecting unit, wherein the data-to-be-printed processing unit comprises a reprocessing unit that reprocesses the data to be printed based on the print control parameter to which the change is instructed by the print control parameter change instructing unit; and the sample image forming unit forms sample images of respective pages based on the data to be printed reprocessed by the reprocessing unit.

10. The print processing apparatus according to claim 9, wherein the print control parameter change instructing unit instructs a change in at least one of print control parameters relating to size reduction, deletion, selection of double-sided or single-sided printing mode, and selection for a specific part to be printed, with respect to a specific page of the print data corresponding to the sample images.

11. The print processing apparatus according to claim 8, wherein the restriction setting unit sets a limit for settlement amount corresponding to the print service fee for printing the data to be printed or a limit for a value.

12. The print processing apparatus according to claim 8, wherein the restriction setting unit sets a limit for a printing time for printing the data to be printed.

13. The print processing apparatus according to claim 8, wherein the restriction setting unit sets a limit for the number of sheets of paper for printing the data to be printed.

14. A print processing method comprising:

reading data to be printed from a data-to-be-printed storage unit that stores data to be printed based on a print instruction;

setting restriction settings to restrict a print service fee to be charged for printing the data to be printed thus read;

processing the data to be printed by modifying the data to be printed thus read into print data according to an algorithm, such that the print data, when charged for, does not exceed the restricted print service fee;

performing settlement processing of a print service fee charged for the print data; and transmitting the print data to a print processing unit and performing print control after completing the settlement processing.

15. The print processing method according to claim 14, wherein the setting of the restriction settings comprises setting a limit for a settlement amount corresponding to the print service fee for printing the data to be printed thus read or a limit for a value.

16. The print processing method according to claim 14, wherein the setting of the restriction settings comprises setting a limit for a printing time for printing the data to be printed thus read.

17. The print processing method according to claim 14, wherein the setting of the restriction settings comprises setting a limit for the number of sheets of paper for printing the data to be printed thus read.

18. A print processing method comprising:

reading data to be printed from a data-to-be-printed storage unit that stores data to be printed based on a print instruction;

setting restriction settings to restrict a print service fee to be charged for printing the data to be printed thus read;

processing the data to be printed by modifying the data to be printed thus read into a plurality of print data according to a plurality of algorithms, such that the each of the plurality of print data, when charged for, do not exceed the restricted print service fee;

forming a plurality of sample images including print image of respective pages based on the plurality of print data;

displaying and controlling on a display the plurality of sample images;

selecting one of the plurality of sample images displayed and controlled on the display;

performing settlement processing of a print service fee charged for print data corresponding to the selected sample image; and transmitting the print data corresponding to the selected sample image to a print processing unit and performing print control after completing the settlement.

* * * * *